United States Patent
Buerger et al.

(10) Patent No.: US 11,104,068 B2
(45) Date of Patent: Aug. 31, 2021

(54) METHOD FOR ENHANCING THE FINISH OF ADDITIVELY-MANUFACTURED COMPONENTS

(71) Applicants: MTU Aero Engines AG, Munich (DE); FRAUNHOFER-GESELLSCHAFT ZUR FOERDERUNG DER ANGEWANDTEN FORSCHUNG E. V., Munich (DE)

(72) Inventors: Laura Buerger, Dachau (DE); Ralph Kropp, Wartenberg (DE); Jeroen Risse, Aachen (DE)

(73) Assignee: MTU AERO ENGINES AG, Munich (DE)

( * ) Notice: Subject to any disclaimer, the term of this patent is extended or adjusted under 35 U.S.C. 154(b) by 476 days.

(21) Appl. No.: 15/802,567

(22) Filed: Nov. 3, 2017

(65) Prior Publication Data
US 2018/0126634 A1 May 10, 2018

(30) Foreign Application Priority Data

Nov. 10, 2016 (DE) .......................... 102016121594.5

(51) Int. Cl.
*B29C 64/188* (2017.01)
*B22F 10/20* (2021.01)
(Continued)

(52) U.S. Cl.
CPC ............ *B29C 64/188* (2017.08); *B22F 10/20* (2021.01); *B29C 64/153* (2017.08); *B33Y 10/00* (2014.12);
(Continued)

(58) Field of Classification Search
CPC ..... B29C 64/188; B29C 64/153; B29C 64/35; B33Y 10/00; B33Y 30/00; B33Y 40/00;
(Continued)

(56) References Cited

U.S. PATENT DOCUMENTS 5,824,256 A * 10/1998 Ballester ................. B29C 45/43
264/318
6,316,744 B1 * 11/2001 Nowotny ............. B23K 26/144
219/121.84
(Continued)

FOREIGN PATENT DOCUMENTS

DE 10236907 A1 2/2004
DE 10300959 A1 7/2004
(Continued)

OTHER PUBLICATIONS

ThorLabs NPL (https://www.thorlabs.com/newgrouppage9.cfm?objectgroup_id=10766) (Year: 2020).*

*Primary Examiner* — Francisco W Tschen
*Assistant Examiner* — Guy F Mongelli
(74) *Attorney, Agent, or Firm* — Abel Schillinger, LLP

(57) ABSTRACT

Discloses are a method and apparatus for the additive manufacture of components by applying layers of powder material on a substrate or a previously produced part of a component and at least partial fusing of the powder material in the powder layer in line with the component cross-section contour along the powder layer and to an underlying solid material of the component or substrate for the purpose of building up several solid layers one on top of the other. Following fusion of the powder material the solid layer just generated is cleaned of powder material and, prior to deposition of the next solid layer, the edge of the solid layer is post-processed by softening the fusion-bonded material.

17 Claims, 3 Drawing Sheets

(51) Int. Cl.
*B33Y 10/00* (2015.01)
*B33Y 30/00* (2015.01)
*B33Y 40/00* (2020.01)
*B29C 64/153* (2017.01)
*B22F 3/24* (2006.01)
*B22F 10/30* (2021.01)
*B29C 64/35* (2017.01)

(52) U.S. Cl.
CPC ............. *B33Y 30/00* (2014.12); *B33Y 40/00* (2014.12); *B22F 10/30* (2021.01); *B22F 2003/247* (2013.01); *B29C 64/35* (2017.08); *Y02P 10/25* (2015.11)

(58) Field of Classification Search
CPC ........ B22F 2003/1059; B22F 2003/247; B22F 2003/1057; B22F 3/1055; Y02P 10/295
See application file for complete search history.

(56) References Cited

U.S. PATENT DOCUMENTS

| | | | | |
|---|---|---|---|---|
| 8,119,053 B1* | 2/2012 | Bedal | ................ | B33Y 70/00 264/308 |
| 8,653,409 B1* | 2/2014 | Sodhi | ................ | G06F 19/00 219/121.66 |
| 2002/0153623 A1* | 10/2002 | Gobron | ................ | B29C 43/36 264/1.1 |
| 2003/0006521 A1* | 1/2003 | Rivola | ................ | B28B 13/022 264/101 |
| 2003/0006525 A1* | 1/2003 | Rivola | ................ | B28B 13/0295 264/139 |
| 2003/0161970 A1* | 8/2003 | Kaito | ................ | B22F 3/1055 219/121.31 |
| 2004/0028769 A1* | 2/2004 | Kreager | ................ | B29C 41/22 425/375 |
| 2004/0099996 A1* | 5/2004 | Herzog | ................ | B22F 3/1055 264/401 |
| 2004/0204531 A1* | 10/2004 | Baumann | ................ | A61K 8/88 524/492 |
| 2004/0217186 A1* | 11/2004 | Sachs | ................ | B41J 2/1429 239/11 |
| 2005/0006819 A1* | 1/2005 | Weihrauch | ................ | B29C 45/16 264/328.12 |
| 2005/0173380 A1* | 8/2005 | Carbone | ................ | B22F 3/1055 219/121.31 |
| 2005/0220983 A1* | 10/2005 | Hayes | ................ | B29C 64/35 427/8 |
| 2005/0263933 A1* | 12/2005 | Welch, IV | ................ | B33Y 30/00 264/113 |
| 2006/0188596 A1* | 8/2006 | Kegasawa | ................ | B29C 48/495 425/133.5 |
| 2007/0238056 A1* | 10/2007 | Baumann | ................ | B22F 3/008 430/325 |
| 2008/0012163 A1* | 1/2008 | Andrews | ................ | H01L 51/0013 264/2.7 |
| 2008/0026090 A1* | 1/2008 | Ehrbar | ................ | B26F 1/40 425/302.1 |
| 2008/0169589 A1 | 7/2008 | Sperry et al. | | |
| 2009/0072450 A1* | 3/2009 | Wallgren | ................ | B22F 3/004 264/462 |
| 2009/0134540 A1* | 5/2009 | Khoshnevis | ................ | B33Y 30/00 264/40.7 |
| 2010/0104804 A1* | 4/2010 | Ito | ................ | B33Y 70/00 428/141 |
| 2010/0121476 A1* | 5/2010 | Kritchman | ................ | B29C 64/393 700/119 |
| 2011/0052645 A1* | 3/2011 | Coulter | ................ | A61J 3/07 424/400 |
| 2011/0143108 A1* | 6/2011 | Fruth | ................ | B29C 64/188 428/198 |
| 2013/0077997 A1* | 3/2013 | Hanson | ................ | G03G 13/00 399/130 |
| 2013/0171431 A1* | 7/2013 | Swartz | ................ | B32B 5/22 428/196 |
| 2013/0287590 A1* | 10/2013 | Neuhaeusler | ................ | B22F 3/1055 416/241 R |
| 2014/0072823 A1* | 3/2014 | Hertter | ................ | B28B 17/0081 |
| 2015/0017055 A1* | 1/2015 | Abe | ................ | B22F 3/105 419/53 |
| 2015/0048209 A1* | 2/2015 | Hoyt | ................ | B64G 1/58 244/131 |
| 2015/0209910 A1* | 7/2015 | Denney | ................ | B23K 9/173 219/76.1 |
| 2015/0231825 A1* | 8/2015 | Swartz | ................ | B29C 64/141 428/156 |
| 2015/0266238 A1* | 9/2015 | Ederer | ................ | B29C 64/153 264/460 |
| 2015/0367415 A1* | 12/2015 | Buller | ................ | G03F 7/70416 |
| 2015/0367448 A1* | 12/2015 | Buller | ................ | B22F 10/40 219/74 |
| 2016/0052087 A1 | 2/2016 | O'Neill | | |
| 2016/0067828 A1* | 3/2016 | Liebl | ................ | B28B 17/0081 |
| 2016/0101470 A1* | 4/2016 | Kamakura | ................ | B33Y 30/00 419/5 |
| 2016/0228918 A1* | 8/2016 | She | ................ | G03F 7/70416 |
| 2016/0236372 A1* | 8/2016 | Benichou | ................ | B28B 17/0081 |
| 2016/0250715 A1* | 9/2016 | Burbaum | ................ | B23K 26/144 219/76.12 |
| 2016/0250809 A1* | 9/2016 | Frayne | ................ | B29C 67/0088 264/400 |
| 2016/0271869 A1* | 9/2016 | Van De Vrie | ................ | B29C 67/007 |
| 2016/0273387 A1* | 9/2016 | Goepfert | ................ | F01D 25/24 |
| 2016/0282848 A1* | 9/2016 | Hellestam | ................ | G03F 7/70416 |
| 2016/0303637 A1* | 10/2016 | Schleichert | ................ | B21D 37/20 |
| 2016/0318247 A1* | 11/2016 | Schlachter | ................ | B29C 64/118 |
| 2016/0318249 A1* | 11/2016 | Kochesfahani | ................ | B29C 64/118 |
| 2016/0318250 A1* | 11/2016 | Moussa | ................ | B33Y 10/00 |
| 2016/0318260 A1* | 11/2016 | Hyde | ................ | B33Y 10/00 |
| 2016/0326613 A1* | 11/2016 | Cui | ................ | C22C 19/055 |
| 2016/0339639 A1* | 11/2016 | Chivel | ................ | B33Y 30/00 |
| 2017/0165792 A1* | 6/2017 | Buller | ................ | B29C 64/357 |
| 2017/0225252 A1* | 8/2017 | Illston | ................ | B23K 7/06 |
| 2017/0239724 A1* | 8/2017 | Diaz | ................ | B23K 26/342 |
| 2017/0252860 A1* | 9/2017 | Bamberg | ................ | B22F 3/1055 |
| 2017/0259504 A1* | 9/2017 | Lin | ................ | B23K 26/0624 |
| 2018/0071986 A1* | 3/2018 | Buller | ................ | B28B 1/001 |

FOREIGN PATENT DOCUMENTS

| | | |
|---|---|---|
| DE | 102013223587 A1 | 6/2015 |
| EP | 2868422 A1 | 5/2015 |
| JP | 2002038201 A | 2/2002 |
| WO | 2015196149 A1 | 12/2015 |

\* cited by examiner

METHOD FOR ENHANCING THE FINISH OF ADDITIVELY-MANUFACTURED COMPONENTS

CROSS-REFERENCE TO RELATED APPLICATIONS

The present application claims priority under 35 U.S.C. § 119 of German Patent Application No. 10 2016 121 594.5, filed Nov. 10, 2016, the entire disclosure of which is expressly incorporated by reference herein.

BACKGROUND OF THE INVENTION

1. Field of the Invention

The present invention relates to a method for the additive manufacture of components by applying layers of powder material and fusing them together, as well as an apparatus for implementing a corresponding method.

2. Discussion of Background Information

Additive manufacturing methods for producing a component are used in industry for so-called rapid tooling, rapid prototyping and in the manufacture of mass-produced articles by means of rapid manufacturing. Examples of additive manufacturing processes are selective laser melting, selective laser sintering, electron beam melting and comparable processes.

In these processes, the component to be produced is built up from layers of powder material, whereby the powder material, in accordance with the layer to be applied, is applied in a layer of powder on a substrate or a previously generated part of a component in order that melting or sintering of the powder may subsequently create a bond both within the powder material and to the component.

For the purpose of generating a powder layer on the component use can be made of a powder bed, in which the previously generated part of the component is disposed and is covered in the build direction of the component by a powder layer, which is selectively deposited on the component in accordance with the contour in the cross-sectional plane of the component to be produced. The surface of the powder bed is chosen such that the powder layer between the previously generated component and the surface of the powder bed is of the desired thickness such that in the next step it is deposited on the component as a solid layer by melting or sintering and subsequent solidification. Through selective melting or sintering in accordance with the cross-sectional pattern of the component to be generated in the respective layer and through subsequent solidification, three-dimensional objects can be generated.

Corresponding apparatuses and methods are known from the prior art, such as those described in DE 10 2013 223 587A1 and WO 2015/196 149 A1, the entire disclosures of which are incorporated by reference herein.

However, a problem with additively manufactured products is that the surfaces generated are very rough and therefore require post-processing, which can be very complex in certain circumstances. In addition, where cavities are formed, it can happen that it is no longer at all possible to post-process the rough surfaces of the cavities, and as a result of the rough surfaces and the possible stress peaks there, impairment of the strength properties may occur in the manufactured component under mechanical load.

In view of the foregoing, it would be advantageous to have available a method for the additive manufacture of components in which the surface roughness of the manufactured component is reduced, such that complex post-processing of the surface can be eliminated or greatly reduced. In particular, a method and a corresponding apparatus for the additive manufacture of components should enable the smoothest possible surfaces to be generated on the manufactured components, wherein the method should nevertheless be efficient and reliable and the outlay on a corresponding apparatus should be kept low.

SUMMARY OF THE INVENTION

The present invention provides a method for the additive manufacture of a component. The method comprises applying layers of powder material on a substrate or a previously produced part of a component and at least partial fusing of the powder material in a powder layer in line with the component cross-section contour along the powder layer and to an underlying solid material of the component or substrate for the purpose of building up several solid layers disposed one on top of the other. Following fusion of the powder material, a solid layer just generated is cleaned of powder material and, prior to deposition of the next solid layer, the edge of the solid layer is post-processed by heating the fusion-bonded material so produced.

In one aspect of the method, the cleaning of the solid layer of powder material may be carried out after every deposition of a solid layer and/or may comprise the removal of powder material from one or more solid layers deposited prior to a most recently applied solid layer and/or may be carried out by at least one method selected from mechanical removal of powder material, brushing, wiping, vacuuming, cleaning by spraying with a fluid, blowing off with compressed air or other gases, raising from a surrounding powder bed and lowering of a powder bed.

In another aspect of the instant method, fusing of the powder material may be carried out by employing a high-energy beam, for example, by selective laser melting or sintering and/or selective electron beam melting or sintering.

In yet another aspect of the above method, post-processing of the edge of a solid layer may be carried out several times prior to deposition of a next solid layer. The heating of the edge of the solid layer may result in softening and/or melting the edge of the solid layer and may be carried out by using a high-energy beam, for example, a laser beam and/or an electron beam. Further, the softening and/or melting of the edge of the solid layer may be effected with from 60% to 90%, e.g., from 70% to 80%, of that power of the high-energy beam with which fusing of the powder material occurs during deposition of a solid layer and/or may take place at from 20% to 50%, e.g., from 30% to 40%, of that feed rate of the high-energy beam at which the high-energy beam for fusing the powder material is moved during deposition of a solid layer.

In a still further aspect of the present method, a high-energy beam for post-processing by heating may originate from the same radiation source as a high-energy beam for fusing the powder material. For example, the beams for the post-processing and fusion may be generated differently and/or may be influenced or shaped differently.

The present invention also provides an apparatus for implementing the method set forth above (including the various aspects thereof). The apparatus comprises a component-holding device for holding a substrate or a previously partially produced component and a powder-application device with a powder bed which at least partially surrounds the component or substrate wherein, with the aid of the powder-application device, a layer of powder to be deposited on the substrate or the component can be deposited as a layer, and wherein the component-holding device is displaceable relative to the surface of the powder bed. The apparatus further comprises a cleaning device with which the partially produced component can be cleaned of powder material, the apparatus being set up such that, during cleaning with the cleaning device, the component-holding device is arranged relative to a powder bed such that the at least partially produced component protrudes at least partially from the powder bed.

In one aspect of the apparatus, the apparatus may further comprise one or at least two beam-generating devices for generating a high-energy beam for fusing the powder material and for post-processing the fused powder material by heating. For example, the apparatus may comprise a beam-shaping unit for influencing or shaping the high-energy beam.

In order that the finish of additively manufactured components may be improved, this invention proposes that, after the deposition of a solid layer, i.e. after the application of powder material and fusion of the powder material within itself and to the underlying material of a substrate or of a previously generated component, at least the most recently deposited solid layer is cleaned of powder material and the edge of the solid layer is post-processed by softening the material before the next solid layer is deposited. This enables smoothing of the edge of the solid layer and thus of the surface of the additively manufactured component.

In particular, the cleaning of powder material from the solid layer can take place after deposition of each solid layer and, correspondingly, post-processing of the edge of the deposited solid layer can be performed between two successive depositions of solid layers.

While the most recently deposited solid layer is being cleaned of loosely adhering powder material, additional areas of the previously produced component, i.e. especially one or more solid layers which were deposited previously and which are preferably adjacent to the most recently deposited solid layer, can also be cleaned of powder material, such that, during the softening of the edge area of the deposited solid layer, surfaces which have previously been smoothed by post-processing are prevented from again being impaired by adhering powder particles.

The cleaning of the solid layer and/or other adjacent parts of the previously generated component can be carried out by a plurality of different cleaning methods which facilitate removal of loose powder material. In particular, mechanical processes can be used to remove the powder material, such as brushing, wiping, or non-contact methods of removing the powder material, such as exhaustion or spraying with a fluid, in particular with compressed air or other gases. In addition, the cleaning step can also comprise the raising of the previously finished component from a surrounding powder bed or the lowering of a surrounding powder bed. The cleaning step or parts thereof can also be carried out several times in succession while the method is being implemented.

The fusion of the powder material can be carried out by all known methods for the additive manufacture of components, especially by selective irradiation with a high-energy beam, e.g. by selective laser beam melting, selective laser sintering, selective electron beam melting or selective electron beam sintering.

The post-processing of the edge of the deposited solid layer by heating of the material can, in accordance with the method of fusing the powder material, also be carried out by means of a high-energy beam, in particular an electron or laser beam whereby, during post-processing with a high-energy beam, the edge material of the post-processed solid layer can be softened and/or melted by heating. In this connection, a high-energy beam can be used which is generated by the same or a separate radiation source as the high-energy beam for the fusing of the powder material. However, where the same radiation source is used, the parameters for generating the high-energy beam can be varied. In addition or alternatively, it is also possible to influence or shape the high-energy beam in different ways after generation, e.g. by widening or by focusing the beam, in order to create different processing conditions for the fusing and post-processing of the fused material. To this end, a corresponding apparatus can have a beam-shaping unit.

Post-processing of the edge of the solid layer before deposition of the next solid layer can, like cleaning, take place several times, such that the edge of the solid layer can be softened and/or melted several times.

The post-processing of the edge of the solid layer and in particular the melting and re-solidification can be performed slowly, especially in comparison to the deposition of the solid layer, in order that the requisite processes may have sufficient time for smoothing the surface of the component.

If a high-energy beam is used to soften and/or melt the edge of the solid layer by heating, the high-energy beam can be operated at a power of about 60% to 90%, especially about 70% to 80%, of that power which is used for the fusing of the powder material during the deposition of the solid layer. Since, during processing of the powder material for the purpose of fusing or during post-processing of the edge of the solid layer, the high-energy beam, e.g. a laser beam or an electron beam, is moved relative to the component to be produced, heating for the purpose of softening and/or melting the edge of the solid layer can be carried out at a feed rate of the high-energy beam relative to the component, which is about 20% to 50%, especially about 30% to 40%, of the feed rate at which the high-energy beam moves during the fusion of the powder material during the deposition of a solid layer. As a result, during post-processing the material can be given sufficient time for the smoothing processes to occur during softening and/or melting of the edge area.

An inventive apparatus for implementing the inventive method thus has at least one cleaning apparatus which is suited to removing powder material from the previously generated component bearing the most recently deposited solid layer before post-processing of the edge of the deposited layer is performed. A corresponding cleaning apparatus can therefore include apparatuses for brushing and/or wiping off and/or for exhausting and/or blowing off powder material. In addition, the apparatus is set up in such a way that during operation of the cleaning apparatus, i.e. when powder material is being removed from the most recently deposited solid layer and preferably from other adjacent areas of the component, a component-holding apparatus on which the component to be produced is disposed can be raised from a surrounding powder bed or the powder bed can be lowered relative to the component-holding apparatus.

BRIEF DESCRIPTION OF THE DRAWINGS

The attached drawings show here in purely schematic form in

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
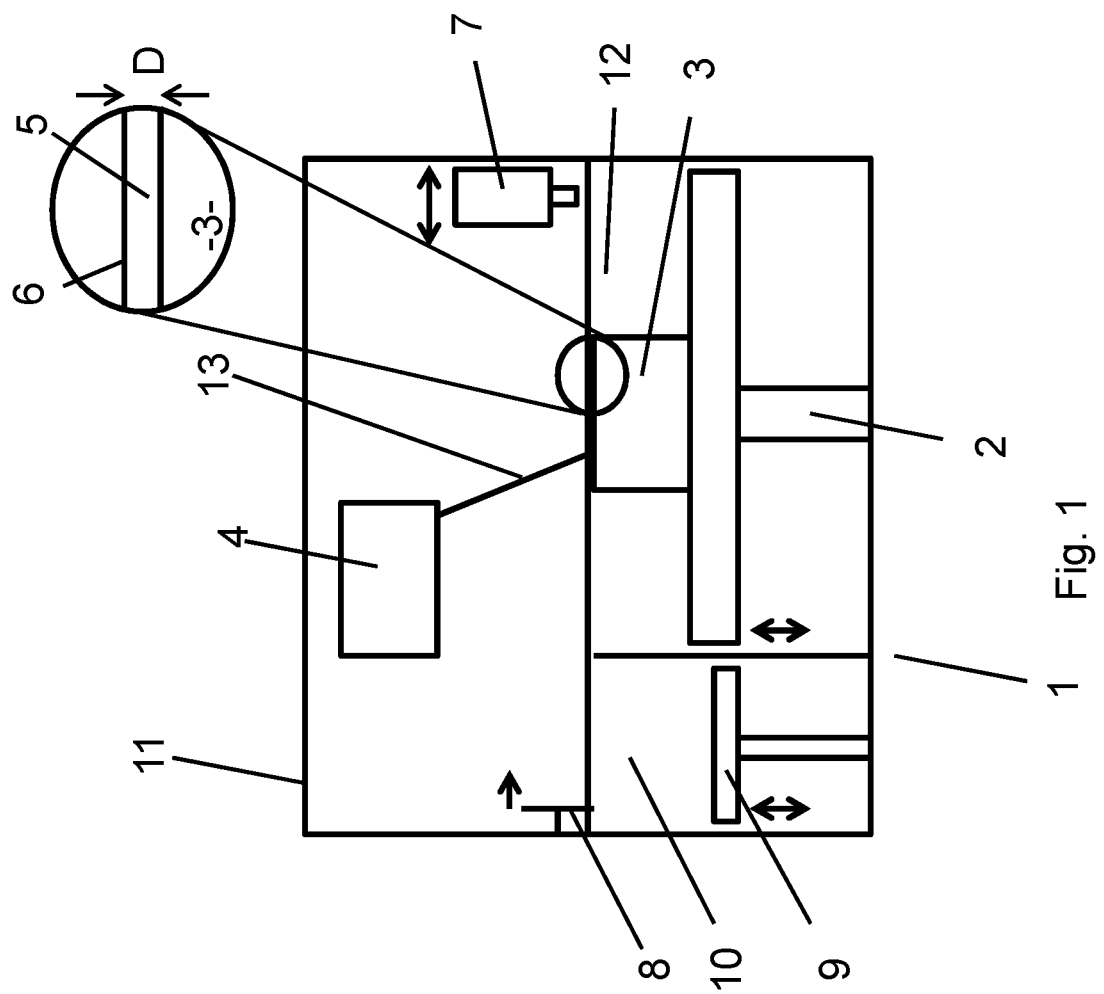
FIG. 1 a schematic representation of an embodiment of an inventive apparatus for the additive manufacture of components as illustrated by the example of selective laser melting, FIG. 2 a description of the processing sequence as per an embodiment of the inventive method and in FIG. 3 a plan view of a powder bed and a produced solid layer.

FIG. 1 shows a purely schematic illustration of an apparatus 1 of the kind which can be used, for example, to additively manufacture a component by means of selective laser melting. The apparatus 1 comprises a lifting table 2, on the platform of which is disposed a semi-finished product 3 (part of a component) on which material is deposited in layers to create a three-dimensional component. For this purpose, powder 10, which is located in a powder reservoir above a lifting table 9, is pushed by means of a slider 8 in layers over the semi-finished product 3 and is melted with the laser beam 13 of a laser 4 such that it bonds to the existing semi-finished product 3. The bonding of the powder material in a layer of powder to the semi-finished product 3 is carried out by the laser 4 in accordance with the desired contour of the component to be produced, such that any desired three-dimensional shapes can be generated. Accordingly, the laser beam 13 is guided over the powder bed 12 in order that, through various points of contact on the powder bed in accordance with the contour of the three-dimensional component in the cross-sectional plane corresponding to the layer to be produced, it may melt powder material and bond it to the previously generated part of a component or a substrate provided initially. In this regard, the laser beam 13 can be guided over the surface of the powder bed 12 by a suitable deflection unit and/or the powder bed can be moved relative to the laser beam 13.

In order that undesirable reactions with the ambient atmosphere during melting or sintering may be prevented, the process can take place in a sealed space provided by a housing 11 of the apparatus 1, and additionally an inert gas atmosphere can be provided, for example, to prevent oxidation of the powder material and the like during deposition. Nitrogen can serve as an example of the inert gas used, which can be supplied via a gas supply that is not shown.

Instead of the inert gas, another process gas could also be used if, for example, reactive deposition of the powder material is required.

In addition, other types of radiation are also conceivable, such as electron beams or other particle beams or light beams which are used in stereolithography.

Slider 8 is designed as a combined levelling and smoothing slider for smoothing the powder layer on the semi-finished product 3 and adjusting it to a certain layer thickness. However, it is also conceivable for the slider 8 merely to provide a rough quantity of the powder material and for an additional levelling and smoothing slider (not shown) to be used.

The levelling and smoothing slider 8 is used to set the required thickness D of the powder layer 5 precisely, as shown in the detailed view of FIG. 1, and moreover to ensure that the powder bed surface 6 of the powder layer 5 is smooth and level, as otherwise inaccuracies and irregularities might arise in the generated component.

The apparatus 1 also comprises a cleaning apparatus in the form of a brush 7, which is used to clean the most recently deposited solid layer and the previously generated component 3 prior to post-processing of the edge of the solid layer. After the powder layer 5 or the powder material contained therein has been melted with the laser beam 13 of the laser 4 in line with the shape of the component to be produced in the cross-section along the powder layer 5 and after solidification of the molten powder material to a solid layer 14 (as shown in illustrations 15 and 16 in FIG. 2), the cleaning apparatus in the form of a brush 7 is used to remove powder material from the solid layer 14 as well as from parts of the component generated previously. For this purpose, the component 3 is raised by the lifting table 2 such that at least the most recently generated solid layer 14, and preferably several, for example 5 to 20, of the most recently generated solid layers, of the component 3 protrude(s) from the powder bed 12, such that the brush 7 can be moved, as indicated by the arrow in FIG. 1, over the previously produced component 3 in order that the most recently generated solid layer and parts of the component 3 may be cleaned of loose powder material by the movement relative to the component 3.

Figure 2:
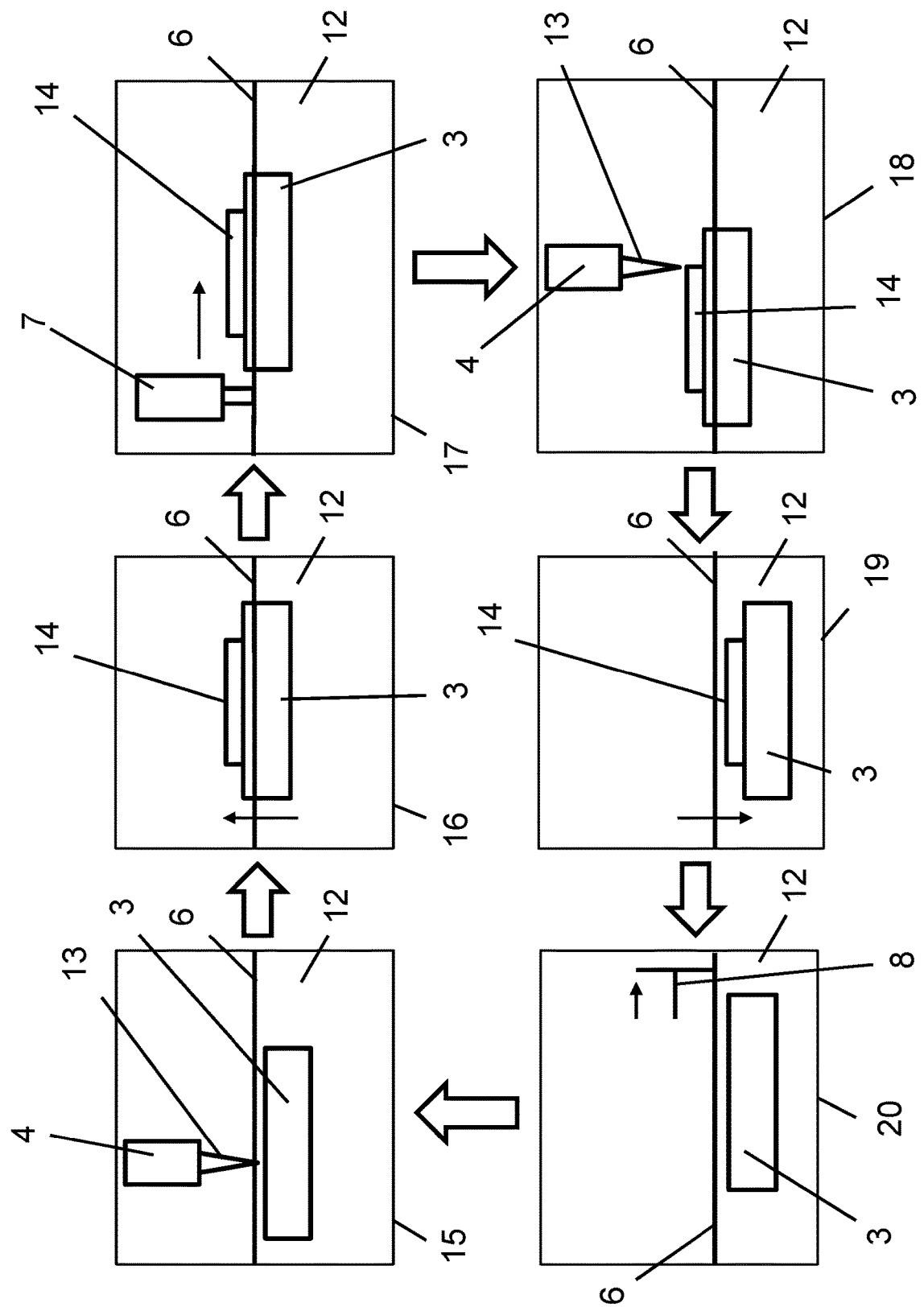

Illustrations 15 to 20 in FIG. 2 show the process steps in detail. In process step 1 as shown in illustration 15, the powder material of a powder layer not shown in more detail in FIG. 2 is melted partially by the laser beam 13 of the laser 4 in accordance with the shape of the component 3 to be produced and forms after solidification a solid layer 14 in accordance with the cross-sectional plane of the component 3 to be produced. In the second process step, as shown in illustration 16, the component 3, together with the solid layer 14 produced on it, is raised from the powder bed 12, such that the most recently generated solid layer 14 and preferably other previously generated solid layers of the component 3 protrude(s) from the powder bed. In the third process step of illustration 17, the brush 7, which can for example be a brush of the kind disclosed in DE 10 2013 223 587A1, is then guided over that part of the component 3 which was previously produced and which protrudes from the powder bed 12, in order that the most recently generated solid layer 14 and adjacent parts of the component 3 which were previously generated may be freed of the powder material. The cleaning step can be repeated several times in succession, so that the brush can be moved back and forth several times to remove loose powder material.

Figure 3:
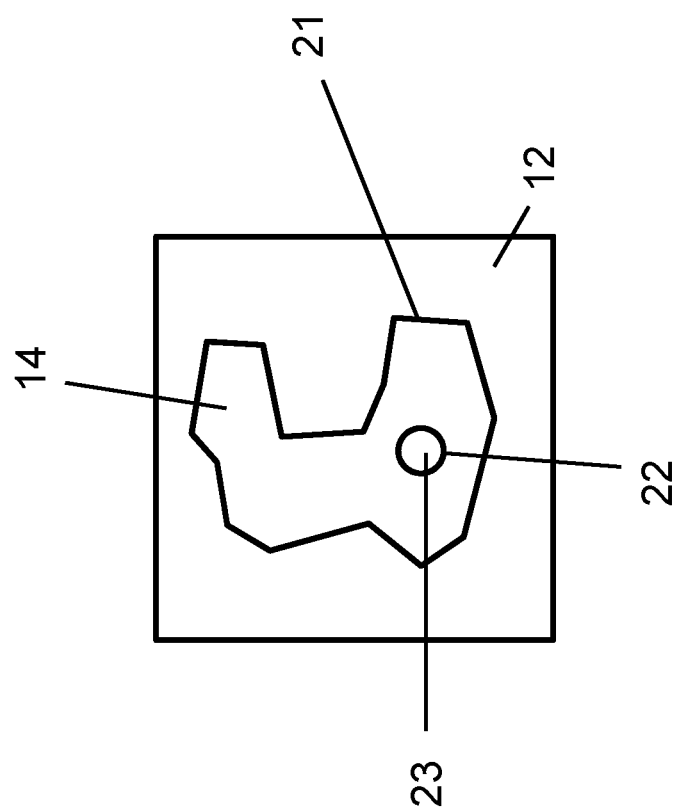

When the cleaning step as shown in illustration 17 is complete, the edge of the solid layer 14 is post-processed by re-melting of the edge with the laser beam 13 of the laser 4, such that the edge area and thus the surface of the component 3 to be produced can be smoothed. This is illustrated in FIG. 3, which shows a plan view of a powder bed 12, wherein the melting and re-solidification of the powder material have created a solid layer 14 which comprises a peripheral outer edge 21 and an inner edge 22 for bounding an inner cavity 23. The post-processing of the edge 21, 22 of the solid layer 14 is performed both along the outer edge and along the inner edge 21, which bounds the cavity 23.

After post-processing of the edge 21, 22 of the most recently applied solid layer 14, the lifting table 2 with the component 3 disposed on it is lowered back into the powder bed 12 (5th process step as per illustration 19) and, as per process step 6 in accordance with illustration 20, a new powder layer 5 is applied by means of the slider 8, such that deposition of a new solid layer 14 can commence with process step 1 as per illustration 15. As shown in the arrows between the illustrations 15 to 20, the process steps 1 to 6 can be repeated over and over for the purpose of depositing a plurality of solid layers 14 until the component to be manufactured is finished.

In the embodiments shown here, two different apparatuses are provided, one for cleaning the most recently deposited solid layer and further parts of the previously generated component 3 and the other for applying a powder layer. However, the cleaning apparatus or parts of it and the apparatus for applying a powder layer, i.e. the brush 7 and the slider 8, can be integrated within a single apparatus, such that one brush or levelling and smoothing slider can be used both for applying a powder layer and for cleaning the previously generated component prior to post-processing of the edge contour.

Although the present invention has been described in detail with reference to the embodiments, it is self-evident to the person skilled in the art that the invention is not limited to these embodiments, but rather that modifications involving the omission of individual characteristics are possible, or that other types of combinations of characteristics can be made without departing from the scope of the appended claims. The present disclosure comprises all combinations of the presented individual characteristics.

LIST OF REFERENCE NUMERALS

1 Apparatus
2 Lifting table
3 Semi-finished product
4 Laser
5 Powder bed
6 Powder bed surface
7 Brush
8 Slider
9 Lifting table
10 Powder
11 Housing
12 Powder bed
13 Laser beam
14 Solid layer
15 Process step 1
16 Process step 2
17 Process step 3
18 Process step 4
19 Process step 5
20 Process step 6
21 Edge of the solid layer
22 Edge of the solid layer
23 Cavity

What is claimed is:

1. A method for the additive manufacturing of a component, wherein the method comprises applying layers of powder material on a substrate or a previously produced part of a component and at least partial fusing of the powder material in a powder layer in line with a component cross-section contour along the powder layer and to an underlying solid material of the component or substrate for the purpose of building up several solid layers disposed one on top of the other, and wherein after producing a solid layer by fusion of the powder material and subsequent solidification, the solid layer just generated is cleaned of powder material and then, prior to deposition of a next solid layer, an edge of the solid layer is post-processed by heating the edge of the solid layer so that only material at the edge is at least one of softened and remelted and thereafter solidified again.

2. The method of claim 1, wherein cleaning of the solid layer of powder material is carried out after every deposition of a solid layer.

3. The method of claim 1, wherein the cleaning of a solid layer comprises removal of powder material from one or more solid layers deposited prior to a most recently applied solid layer.

4. The method of claim 1, wherein cleaning of the solid layer is carried out by at least one method selected from mechanical removal of powder material, brushing, wiping, vacuuming, cleaning by spraying with a fluid, blowing off with compressed air or other gases, raising from a surrounding powder bed and lowering of a powder bed.

5. The method of claim 1, wherein fusing of the powder material is carried out by employing an energy beam.

6. The method of claim 5, wherein fusing of the powder material is carried out by at least one of selective laser melting or sintering and selective electron beam melting or sintering.

7. The method of claim 1, wherein post-processing of the edge of a solid layer is carried out several times prior to deposition of a next solid layer.

8. The method of claim 1, wherein heating of the edge of the solid layer results in softening and/or melting the edge of the solid layer and is carried out by using an energy beam.

9. The method of claim 8, wherein the energy beam comprises at least one of a laser beam and an electron beam.

10. The method of claim 8, wherein softening and/or melting of the edge of the solid layer is effected with from 60% to 90% of that power of the energy beam with which fusing of the powder material occurs during deposition of a solid layer.

11. The method of claim 8, wherein softening and/or melting of the edge of the solid layer is effected with from 70% to 80% of that power of the energy beam with which fusing of the powder material occurs during deposition of a solid layer.

12. The method of claim 8, wherein softening and/or melting of the edge of the solid layer takes place at from 20% to 50% of that feed rate of the energy beam at which the energy beam for fusing the powder material is moved during deposition of a solid layer.

13. The method of claim 8, wherein softening and/or melting of the edge of the solid layer takes place at from 30% to 40% of that feed rate of the energy beam at which the energy beam for fusing the powder material is moved during deposition of a solid layer.

14. The method of claim 10, wherein softening and/or melting of the edge of the solid layer takes place at from 20% to 50% of that feed rate of the energy beam at which the energy beam for fusing the powder material is moved during deposition of a solid layer.

15. The method of claim 11, wherein softening and/or melting of the edge of the solid layer takes place at from 30% to 40% of that feed rate of the energy beam at which the energy beam for fusing the powder material is moved during deposition of a solid layer.

16. The method of claim 1, wherein an energy beam for post-processing by heating stems from the same radiation source as an energy beam for fusing the powder material.

17. The method of claim 16, wherein the energy beams for the post-processing and fusion are generated differently and/or are influenced or shaped differently.

* * * * *